J. E. BRADFORD & B. H. SPICER.
NUT LOCK.
APPLICATION FILED JULY 7, 1915.
1,176,197.
Patented Mar. 21, 1916.
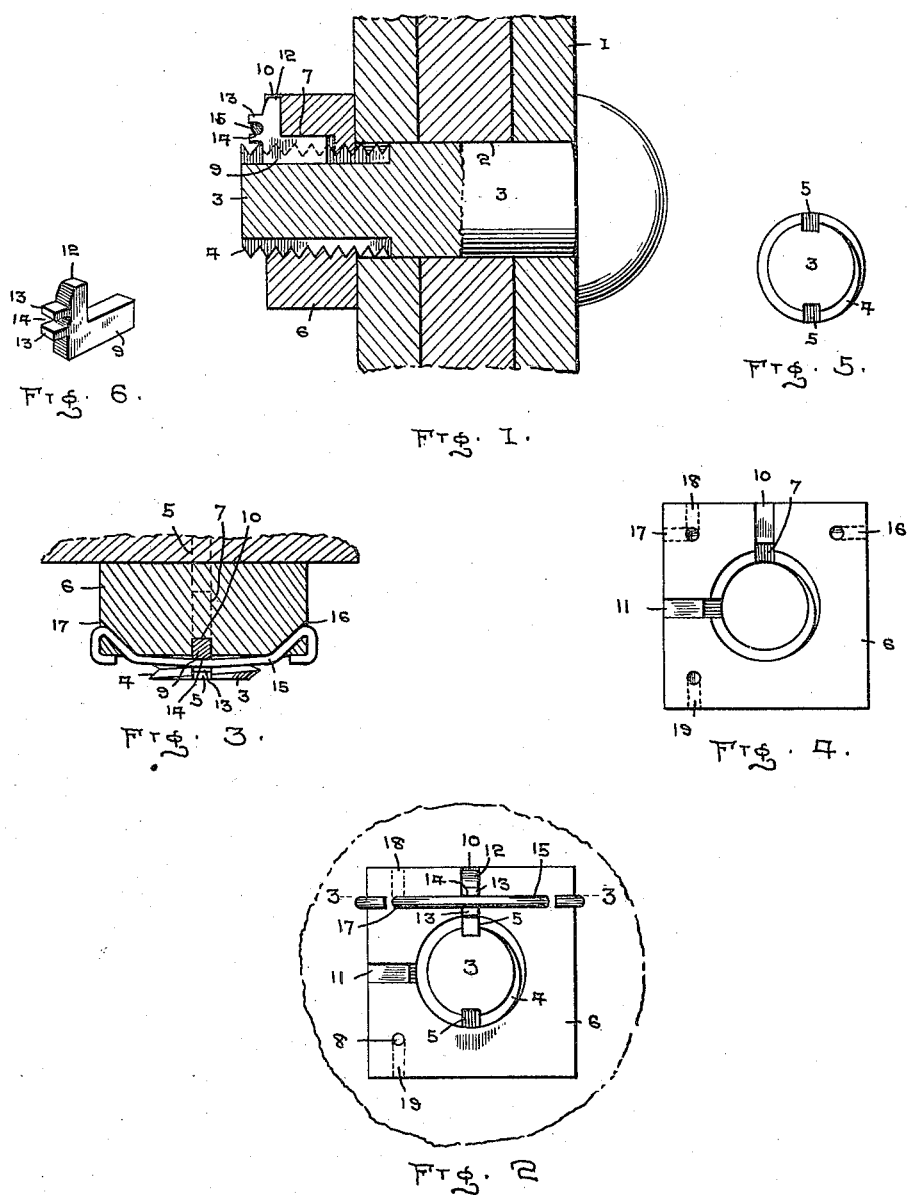
Witnesses
Thos. W. Riley
C. S. Frye.
Inventors
J. E. Bradford
B. H. Spicer
By W. J. FitzGerald
Attorney

UNITED STATES PATENT OFFICE.

JESSE E. BRADFORD AND BENJAMIN H. SPICER, OF NORWICH, OHIO.

NUT-LOCK.

1,176,197.  Specification of Letters Patent.  Patented Mar. 21, 1916.

Application filed July 7, 1915. Serial No. 38,427.

*To all whom it may concern:*

Be it known that we, JESSE E. BRADFORD and BENJAMIN H. SPICER, citizens of the United States, residing at Norwich, in the county of Muskingum and State of Ohio, have invented certain new and useful Improvements in Nut-Locks; and we do hereby declare the following to be a full, clear, and exact description of the invention, such as will enable others skilled in the art to which it appertains to make and use the same.

Our invention relates to new and useful improvements in nut locks and our object is to provide a locking key adapted to enter registering slots in the nut and bolt for preventing rotation of the nut.

A further object is to so construct the locking key and the coöperating slots as to prevent undue lateral movement of the key.

A further object is to so construct the nut and bolt that the nut may be locked with each quarter turn upon the bolt. And a further object is to provide means for locking the key in engagement with the nut and bolt.

Other objects and advantages will be hereinafter set forth and more particularly pointed out in the accompanying specification.

In the accompanying drawings which are made a part of this application, Figure 1 is a longitudinal sectional view of a bolt and nut applied to use, showing the locking key engaged therewith. Fig. 2 is an end elevation thereof in locked position. Fig. 3 is a sectional view as seen on line 3, 3 of Fig. 2. Fig. 4 is an elevation of a nut showing the locking mechanism removed. Fig. 5 is an end elevation of the bolt, and Fig. 6 is a perspective view of the locking key.

Referring to the drawings in which similar reference numerals designate corresponding parts throughout the several views, 1 indicates an object, parts of which are to be secured together, such as a web of a rail and the fish plates therefor, through which are provided openings 2 and through said openings is extended a bolt 3 of the usual or any preferred construction, the threaded end 4 of the bolt having longitudinally extending slots 5 arranged centrally of the axis of the bolt and on diametrically opposite sides from each other. Coöperating with the threaded end of the bolt is a nut 6 having preferably a pair of slots 7 and 8 extending transversely of the nut, and adapted to be registered with the slots 5 of the bolt and coöperating with said slots is a key 9, the body of the key being so constructed as to snugly fit the cavity created by bringing one of the slots of the nut in registration with one of the slots of the bolt and when seated in said cavity the nut will be held against further rotation until the key is again removed. Intersecting the outer ends of the slots 7 and 8 and extending at right angles thereto are recesses 10 and 11 respectively, in which is adapted to seat an angular extension 12 of the key, said angular extension, when entered in the recess, reaching substantially to the outer edge of the nut. Projecting from the outer vertical edge of the angular extension 12 is a pair of lugs 13 which are spaced apart to form a seat 14 and through this seat extends a securing wire 15 or other locking means.

The ends of the wire are introduced through inclined openings 16 and 17 which are arranged adjacent the corners of the nut and in line transversely with the seat 14 of the locking key, and it will be readily seen that when the key is properly seated, the securing wire engaged with the seat, and the ends thereof introduced through the inclined openings and bent over the adjacent faces of the nut, said key will be securely held in locked position.

In order to lock the nut at every quarter revolution upon the bolt and at the same time to employ but two of the slots 5 in the bolt, the slots 7 and 8 are placed at an angle of 90° from each other, or in other words, when the slot 7 is in a vertical position, the slot 8 is in a horizontal position and at direct right angles with the slot 7 with respect to the axis of the bolt and by interchanging the key between the slots 7 and 8, the nut can be locked at every quarter revolution. To provide means for locking the key in the slots when in engagement with the slot 8, the inclined opening 17 is provided with a branch opening 18 which extends from the outer face of the nut to the outer edge of the nut and substantially at right angles to the opening 17, and an inclined opening 19 is likewise arranged at the opposite edge of the nut so as to bring the securing wire engaged with the branch opening 18 and the opening 19, in registration with the seat 14 of the key.

In applying the lock to use, the nut is turned to the proper position upon the bolt and the key introduced into one of the slots 5 and whichever of the slots 7 or 8 registering with the slot in the bolt. The ends of the securing wire 15 are then introduced through the respective inclined openings adjacent the corners of the nut until the wire is positioned in the seat 14 when the ends of the wire are bent over the faces of the nut or secured in any other manner, thereby positively locking the nut in engagement with the bolt until such time as the wire and locking key are removed from engagement therewith.

In view of the simplicity of this device, it can be very cheaply constructed and applied to use and is positive in its operation, and it will further be seen that when the locking key is properly positioned and secured by the wire, it will be impossible for the key to casually leave its locked position. It will also be understood that this device can be successfully applied to a bolt or nut of any size and that any suitable wire may be employed for locking the key in position.

Having thus fully described our invention what we claim as new and desire to secure by Letters Patent is:—

In a nut lock, the combination with a bolt having longitudinally extending slots therein, a nut having slots adapted to successively register with the slots of the bolt, said nut also having an angular recess at the end of each slot in the face thereof, of a key adapted to enter the registering slots, and angular extensions formed at one end of the key and adapted to rest in the recess in the face of the nut, spaced lugs on the angular extensions forming a seat, a wire extending through said seat, said nut having openings adapted for the reception of the wire to anchor the ends of the said wire to hold the key seated in the registering slot.

In testimony whereof we have signed our names to this specification in the presence of two subscribing witnesses.

JESSE E. BRADFORD.
BENJAMIN H. SPICER.

Witnesses:
C. H. McDOWELL,
E. C. JORDAN.

Copies of this patent may be obtained for five cents each, by addressing the "Commissioner of Patents, Washington, D. C."